(12) United States Patent
Finkenbiner

(10) Patent No.: US 10,513,018 B2
(45) Date of Patent: Dec. 24, 2019

(54) ADAPTIVE U-BOLT JOINT STABILIZATION PROCESS

(71) Applicant: Atlas Copco Tools & Assembly Systems LLC, Auburn Hills, MI (US)

(72) Inventor: Mark Allen Finkenbiner, Conway, SC (US)

(73) Assignee: Atlas Copco Tools & Assembly Systems, LLC, Auburn Hills, MI (US)

( * ) Notice: Subject to any disclaimer, the term of this patent is extended or adjusted under 35 U.S.C. 154(b) by 204 days.

(21) Appl. No.: 15/456,707

(22) PCT Filed: Sep. 18, 2015

(86) PCT No.: PCT/US2015/050887
§ 371 (c)(1),
(2) Date: Mar. 13, 2017

(87) PCT Pub. No.: WO2016/044699
PCT Pub. Date: Mar. 24, 2016

(65) Prior Publication Data
US 2017/0203420 A1      Jul. 20, 2017

Related U.S. Application Data

(60) Provisional application No. 62/051,996, filed on Sep. 18, 2014.

(51) Int. Cl.
*B25B 17/02* (2006.01)
*B23P 19/06* (2006.01)
(Continued)

(52) U.S. Cl.
CPC ........ *B25B 23/1456* (2013.01); *B23P 19/066* (2013.01); *B23P 19/069* (2013.01);
(Continued)

(58) Field of Classification Search
CPC ..... B25B 17/02; B25B 23/1422; B25B 23/14; B25D 2250/205; B23P 19/069; Y10T 29/49766
See application file for complete search history.

(56) References Cited

U.S. PATENT DOCUMENTS 3,965,778 A      6/1976  Aspers et al.
4,163,311 A *    8/1979  Sigmund .................. B25B 23/14
                                                             173/182
(Continued)

FOREIGN PATENT DOCUMENTS

CN       101832320 A       9/2010
DE        1024577 A1       2/1992
(Continued)

OTHER PUBLICATIONS

Keep U-Bolt Nuts Tight! Retrieved Jun. 22, 2014 http://www.suspensionspecialists.com/tech0004.html.
(Continued)

*Primary Examiner* — Jermie E Cozart
(74) *Attorney, Agent, or Firm* — Young Basile Hanlon & MacFarlane, P.C.

(57) ABSTRACT

An adaptive mechanical joint control and stabilization process and device having particular usefulness in mechanical joints employing U-bolts. The method and device monitors at least two predetermined metrics during a fastener tightening clampload cycle and compares the work expended in achieving a target limit value. Through examining the work expended through the monitored metrics, additional clampload cycles will automatically be run until the monitored work expended for all of the fasteners falls within predetermined values increasing the stabilization of the joint and further advantages of increased residual clampload. The process and device is useful in separating clampload cycles which form or yield the fastener from a final clampload
(Continued)

cycle which properly elongates the fastener for a secure clampload and stabilized joint.

14 Claims, 8 Drawing Sheets

(51) Int. Cl.
    *B25B 23/14*         (2006.01)
    *B25B 23/142*       (2006.01)
    *B25B 23/145*       (2006.01)
    *B25B 23/147*       (2006.01)

(52) U.S. Cl.
    CPC ............ B25B 17/02 (2013.01); B25B 23/147 (2013.01); *B25B 23/14* (2013.01); *B25B 23/1422* (2013.01); *B25D 2250/205* (2013.01); *Y10T 29/49766* (2015.01)

(56) References Cited

U.S. PATENT DOCUMENTS

| | | | | |
|---|---|---|---|---|
| 4,274,188 | A * | 6/1981 | Eshghy | B23P 19/066 |
| | | | | 173/183 |
| 4,344,216 | A * | 8/1982 | Finkelston | B23P 19/066 |
| | | | | 173/183 |
| 4,375,123 | A * | 3/1983 | Ney | B23P 19/066 |
| | | | | 173/183 |
| 4,633,564 | A | 1/1987 | Sauber | |
| 4,790,703 | A | 12/1988 | Wing | |
| 4,908,926 | A | 3/1990 | Takeshima et al. | |
| 4,961,035 | A | 10/1990 | Inaba et al. | |
| 4,995,145 | A | 2/1991 | Eshghy | |
| 5,409,339 | A | 4/1995 | Rosser | |
| 5,792,967 | A | 8/1998 | Steber et al. | |
| 5,837,907 | A | 11/1998 | Ohmi et al. | |
| 6,941,634 | B2 | 9/2005 | Bigsby | |
| 7,062,998 | B2 | 6/2006 | Hohmann et al. | |
| 7,530,153 | B2 | 5/2009 | Doan et al. | |
| 7,650,791 | B2 | 1/2010 | Cioto et al. | |
| 2002/0148299 | A1 * | 10/2002 | Leong | B23P 19/042 |
| | | | | 73/761 |
| 2005/0005412 | A1 * | 1/2005 | Zolotarev | B23Q 1/26 |
| | | | | 29/407.02 |
| 2006/0185146 | A1 * | 8/2006 | Piggins | B23P 19/066 |
| | | | | 29/407.02 |
| 2008/0209707 | A1 * | 9/2008 | Cioto | B23P 19/066 |
| | | | | 29/407.02 |
| 2009/0115156 | A1 | 5/2009 | Tsujihama et al. | |

FOREIGN PATENT DOCUMENTS

| | | | |
|---|---|---|---|
| EP | 0264034 A2 | 4/1988 | |
| WO | WO-9710928 A1 * | 3/1997 | ............ B23P 19/066 |
| WO | 2009135201 A2 | 11/2009 | |
| WO | 2010140950 A1 | 12/2010 | |

OTHER PUBLICATIONS

PCT/US2015/050887, International Search Report and Written Opinion, Dec. 16, 2015.

* cited by examiner

ADAPTIVE U-BOLT JOINT STABILIZATION PROCESS

TECHNICAL FIELD

The invention generally relates to the field of mechanical fastening. The invention is particularly useful in fastening and stabilizing joints using U-shaped bolts commonly referred to as U-bolts. The invention is particularly, but not exclusively, useful in securing large truck wheel axles to leaf spring suspension components.

BACKGROUND

It is a longstanding problem in the field of securing large, multi-component vehicle joints through the use of U-bolts. An example of such joints occurs in the attachment of wheel axles for large commercial trucks.

Referring to FIG. 1, an example of a multi-component U-bolt joint for a large truck is shown. A highly useful application of the adaptive inventive process is to secure a heavy-duty truck axle to the truck suspension leaf spring. The axle is shown inverted 180 degrees which is a common orientation to assemble these vehicle components. In the example, a U-bolt joint 20 including a pair of U-shaped bolts (referred hereinafter as U-bolt or U-bolts) 24 are used to secure truck axle 30 to a leaf spring stack 36 as generally shown. Each U-bolt 24 includes a long shaft or leg 40 defining an axis 50 having threaded portions 54 on the respective ends of the legs. Depending on the design of the truck, the joint 20 may further have a mounting plate 70 (shown integral with the axle in the example) and one or more spacers or risers 80 between the leaf springs and axle. Depending on the vehicle and/or joint design, the spacers 80 may be small/thin or six (6) or more inches in height.

A fastener nut 60 is threaded on each threaded portion 54 and tightened to apply a compressive force on the joint 20 to secure the axle 30 to the leaf spring 36. This is typically done at each wheel. Examples of U-bolts for heavy-duty truck axles mounts are ¾ or ⅞ inches in diameter and may range for 6 inches to more than 24 inches in length from crown 44 to leg end. Shims 48 may be used between the crown 44 and leaf spring stack 36 as generally shown. Common target torque values for each nut may range from around 300 foot-pounds (ft-lbs) to 450 foot-pounds or more depending on the size of the U-bolts and application. Applications other than on heavy trucks and having different U-joint subcomponents and sizes of U-bolts 24 known by those skilled in the art may be used. It is further contemplated that application of the inventive adaptive stabilization process 10 may be used on fastening bolts or studs other than U-bolts, and in different sizes, lengths and fastener configurations as described and illustrated herein as known by those skilled in the art.

These axle joints 20 are problematic in the vehicle assembly process due to the relatively non-precision nature of such large, heavy components often made from rough cast or forged steel or iron. Where precision is required, localized machining may be employed. However, due to the unprotected, exterior vehicular environment and heavy-duty use, even precision surfaces are often coated with thick rust and corrosion resistant protectants and exterior lubricants, such as heavy greases. The protective coatings and other imprecise features of each component prevent precision alignment or stack-up in any orthogonal direction. As the wheel axles support the wheels and the entire weight of the vehicle, it is important that these joints form stable, secure connections of the axle to the truck suspension.

Conventional techniques to torque the U-bolt nuts 60 to proper specifications have historically been problematic and inefficient both in initial assembly and during the initial stages of truck usage. In order to reduce the time to assemble large trucks and amount of manual labor, automated nut driving devices have been employed to simultaneously tighten the nuts 60. In the example shown in FIG. 3, a spindle device 82 includes four independently monitored and controlled nut drivers 94 as generally shown. Each driver includes a socket 96 suitable for engaging a nut, for example U-bolt nut 60 shown in FIG. 1.

Spindle devices 82 are rotatably connected to electric motors in electronic communication with programmable controllers 98 which raise and lower the drivers and precisely control the rotational movement of each nut driver 94. As schematically shown in FIG. 9, exemplary spindle device 82 is connected to a larger control unit 84 including, for example, one or more computer processors 86, controllers 88, short and/or long term memory storage devices 90, and communication hardware 91 in electrical and data communication with one another to store, send and receive instructions to operate spindle device 82 through communication link 92 as generally shown. Monitoring instruments and associated hardware and software (not shown) to operate and guide spindle devices 82 (only one shown) allow for real time measurement, recordation and processing of many different metrics, for example rotational torque, angular rotation, yield, amperage and time for each individual nut driver 94. These metrics and data can be stored, analyzed and visuals presented for use by technicians for applications such as process 10 as more fully described below. One example of an industrial nut driver is QST90-1000CT model number 8435 6090 10 manufactured by Atlas Copco. Information on the example can be found at www.atlascopco-.com/Atlas Copco Industrial Power Tools Catalog the entire contents of the example is incorporated herein by reference.

Even sophisticated prior fastener and nut driving devices suffered disadvantages in securing the imprecise axle U-bolt joints 20. For example, even under synchronized and simultaneous turning of the four U-bolt nuts 60, the several joint components may shift relative to one another and skew the initial geometric stack thereby forcing the U-bolts 24 to skew or cock. On this occurrence, often one leg 40 of a U-bolt 24 may shift relative to the mounting plate leaving less threads for the nut to engage and lengthening the exposed threads on the other leg for the respective U-bolt nut to engage.

As the nut drivers 94 continue to rotate the nuts 60 and apply torque, the nut on the U-bolt leg with reduced exposed or available threads 54 extending above the mounting plate 70 reaches a predetermined torque value sooner than the other leg which keeps rotating that nut until the specified torque is reached. Once the torque value is reached a driver 94 will stop so as to not over-torque the nut and either strip the nut threads or facture the U-bolt leg 40. If one nut hits the predetermined torque value limit well prior to the other leg, the joint is further subject to geometric distortion and increased stresses on the U-bolt which can lead to bolt fracture and joint failure at assembly.

It is also common due to the long length of the U-bolt legs and relatively lower lateral strength of the U-bolts compared to the heavy-duty joint sub-components, that the U-bolts will laterally yield or permanently bend to accommodate shifting of the subcomponents on the high compressive forces imparted by torqueing the nuts. It has been discovered that when a U-bolt joint assembly becomes skewed or misaligned during assembly using conventional compression techniques, the nut torque or resistive force to further compression is at least in part generated by lateral bending or work hardening, elastic and/or plastic deformation, of the U-bolt legs and not from elastic (recoverable) axial elongation of the U-bolt legs 40 which is required of a mechanical fastener for proper residual torque on the nut and lasting compression of a stabilized joint.

An example of a torque versus degree of angular rotation data tracing of a conventional truck axle U-bolt joint tightening process is shown in FIG. 4. In the example, two U-bolts each including two shafts 40 and each shaft 40 requiring a nut 60 (four (4) legs and four (4) nuts total 102, 110, 114 and 120). At angle zero (0) tightening of all four nuts 102, 110, 114 and 120 begins simultaneously by a spindle driver similar to 82 toward a target torque 130 value (in the example, 275 ft-lbs). The exemplary test tracing shows a common phenomenon for tightening U-bolt joints. As the example shows, the first nut 102 reaches the target torque 130 at point 134 at about 350 degrees of rotation and the nut driver stops. The third nut achieves the target torque 130 in about 460 degrees of rotation at 138. The second nut 110 achieves the target torque after about 825 degrees at 140. The fourth nut 120 achieves that target torque 130 at over a 1000 degrees of rotation.

It is well documented that such U-bolt joints suffer from poor residual torque, i.e. a subsequently measured nut torque following an initial torqueing after a joint's residual stresses and temperature ease and the joint "relaxes." Due to the above-described problems, there is also large variation in the residual torques from nut-to-nut and joint-to-joint.

In order to cure the deficiencies in the conventional initial torquing process, one or more checks of the nut torques must be manually made by technicians to ensure the nuts are to the specification torque values. If any of the torque values are too low, the nuts have to be manually re-torqued to specification values by a technician in the assembly plant or out in the field, for example prior to new truck delivery and before the truck is placed into service. Due at least in part to the difficulties in conventional initial assembly as described and nature of the joint, manufacturers recommend additional U-bolt nut torque checks at regular intervals of service. The manual checking and re-torquing is manually intensive and in difficult areas on the underside of the vehicle.

Therefore, there is a need to improve upon these assembly deficiencies and produce a more efficient assembly process forming more robust U-bolt joints requiring fewer subsequent manual processes.

BRIEF SUMMARY

The inventive method is an adaptive process to secure and stabilize mechanical fastener joints. The process is particularly, although not exclusively, effective for use in mechanical joints using large U-bolts, for example in securing large truck axles to suspension leaf springs.

The invention independently monitors pre-selected metrics against predetermined limits values or ranges for each U-bolt leg fastening nut during simultaneous torqueing of the nuts. In one example, on a first clampload cycle of initially torqueing the nuts (or other fastener) to a predetermined target torque value or predetermined limit value, the joint is allowed to dissipate some elevated temperature and stresses built up on the initial run-up to the predetermined torque specification or limit value.

Based on the chosen monitoring metrics, for example a first metric of torque (ft-lbs.) versus a second metric of time (seconds) or torque versus angular rotation of a nut (degrees), a determination is made whether each of the nuts has reached the predetermined target torque or limit value within an acceptable range, for example seconds of time or angle of rotation of the nut. If one or more nuts is determined to have reached the monitored metrics outside of the predetermined acceptable value limit range, this indicates potential lateral bending or work hardening of the U-bolt legs and not the desired axial extension of the U-bolt legs for proper clampload, residual torque and stabilization of the joint.

In an example, on one or more monitored torque (or other preselected metric) values falling outside the predetermined range or limit, a second clampload cycle is automatically run as described above. In one example of a clampload cycle, all of the nuts (or other engaged joint fasteners) are all automatically loosened to a lower torque and then simultaneously run-up again and re-torqued to the predetermined target or limit value and a second determination made if the targeted torque (or other preselected metric) is reached within the predetermined or acceptable range for the selected metric. This process is repeated until all of the nuts reach the targeted torque value within an acceptable range for the chosen metric.

In a preferred example, the predetermined and monitored first and second metrics are plotted in a 2-dimensional graph forming a curve or tracing having an area below the curve. The area below the curve represents work expended to drive the fastener to the target or limit value. The area under the curve is compared to a predetermined or acceptable area limit value and a determination is made whether the plotted (or otherwise measured) curve area is within the acceptable range. If the plotted curve area is outside the acceptable value or range, a second clampload cycle is initiated. The clampload cycles repeat until each of the fasteners curve area (or other monitored metrics or measurements) fall within acceptable values or ranges, or are otherwise stopped through predetermined limits.

The exemplary multiple clampload cycles of torqueing to the target value has the effect of separating clampload cycles which involve significant lateral bending or work hardening of the exemplary U-bolt fasteners and a final tightening clampload cycle which promotes and/or ensures proper elongation of each of the U-bolt shafts. This separation of work hardening from final campload cycles allows the lateral bending or work hardening of the U-bolt and shifting of the subcomponents to occur prior to the final torqueing effectively stabilizing the joint prior to the final torqueing clampload cycle in the process. The final clampload torqueing cycle then focuses the compressive forces on the stabilized joint components and elongates the U-bolt legs for proper fastening and residual torque on the nuts to maintain joint compression.

Studies have shown the present invention achieves higher residual torques in the stabilized U-bolt joints with less variation in residual torque in a joint. This reduces or eliminates subsequent manual processes of checking the residual torque in the assembly plant or in the field creating more robust joints and large reductions in labor.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Referring to FIGS. 5-9 examples of an adaptive U-bolt joint stabilization process 10 is and device are illustrated and explained hereafter. A preferred, but not exclusive, application of the process and device 10 and exemplary device 12 is for mounting a heavy-duty truck axle to suspension leaf springs as generally showed in FIG. 1. It is understood that the inventive process 10 and device 12 can be used on other mechanical joints, fastening systems and fasteners without deviating from the present invention. It is further understood that process 10 and device 12 may be used for other mechanical fastening applications known by those skilled in the art.

Figure 1:
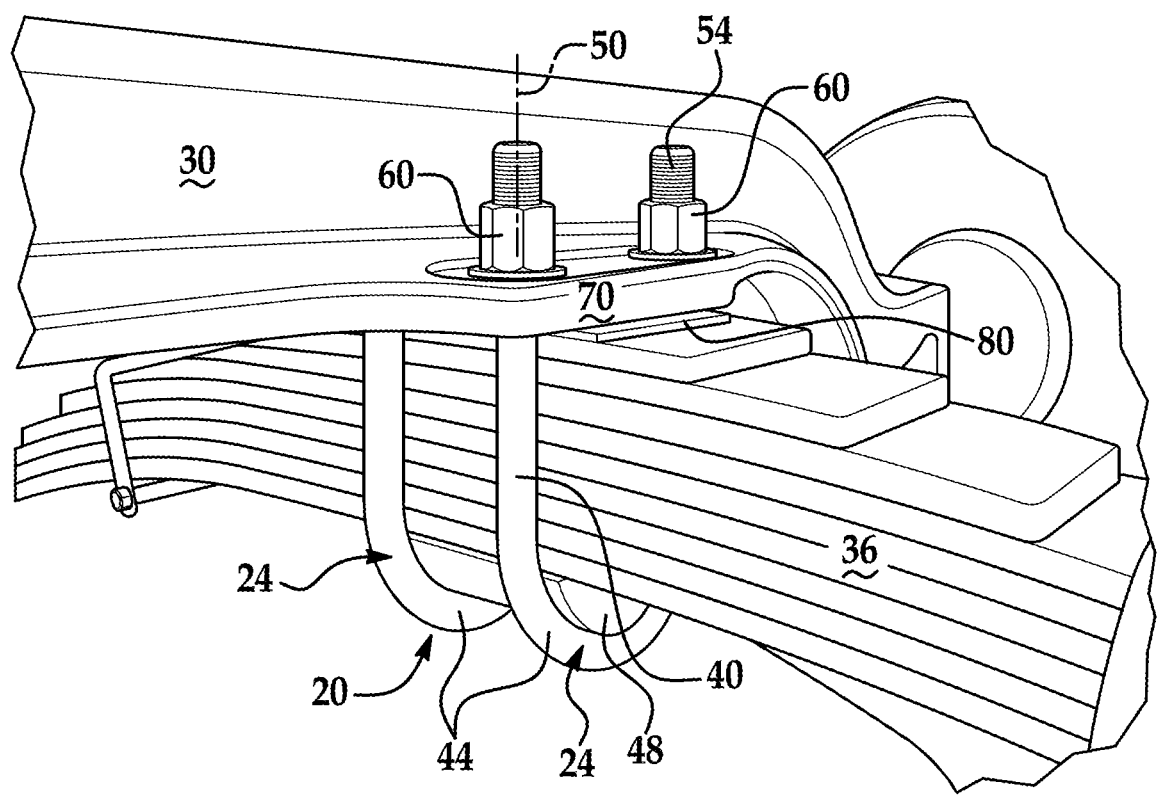
FIG. 1 is an perspective view of an example of a conventional U-bolt joint for a heavy duty truck axle.

In the example shown in FIG. 1 process 10 and device 12 may be used on a U-bolt joint 20 including a pair of U-bolts 24 having elongate shafts or legs 40, each with a threaded end 54 defining an axis 50 as previously described. Joint 20 would typically be loosely assembled and a nut threaded on a respective U-bolt leg 40 by hand. Alternately, the joint 20 would be loosely assembled, but the nuts would be positioned or preloaded in a driver's 94 sockets 96 generally illustrated in FIG. 3 or other automated equipment as known by those skilled in the art. An exemplary application for the U-bolts for a heavy duty truck axle assembled in an assembly area 14 along an assembly line in an assembly plant (not shown). Other applications and manufacturing and assembly facilities known by those skilled in the art may be used without deviating from the invention.

Figure 3:
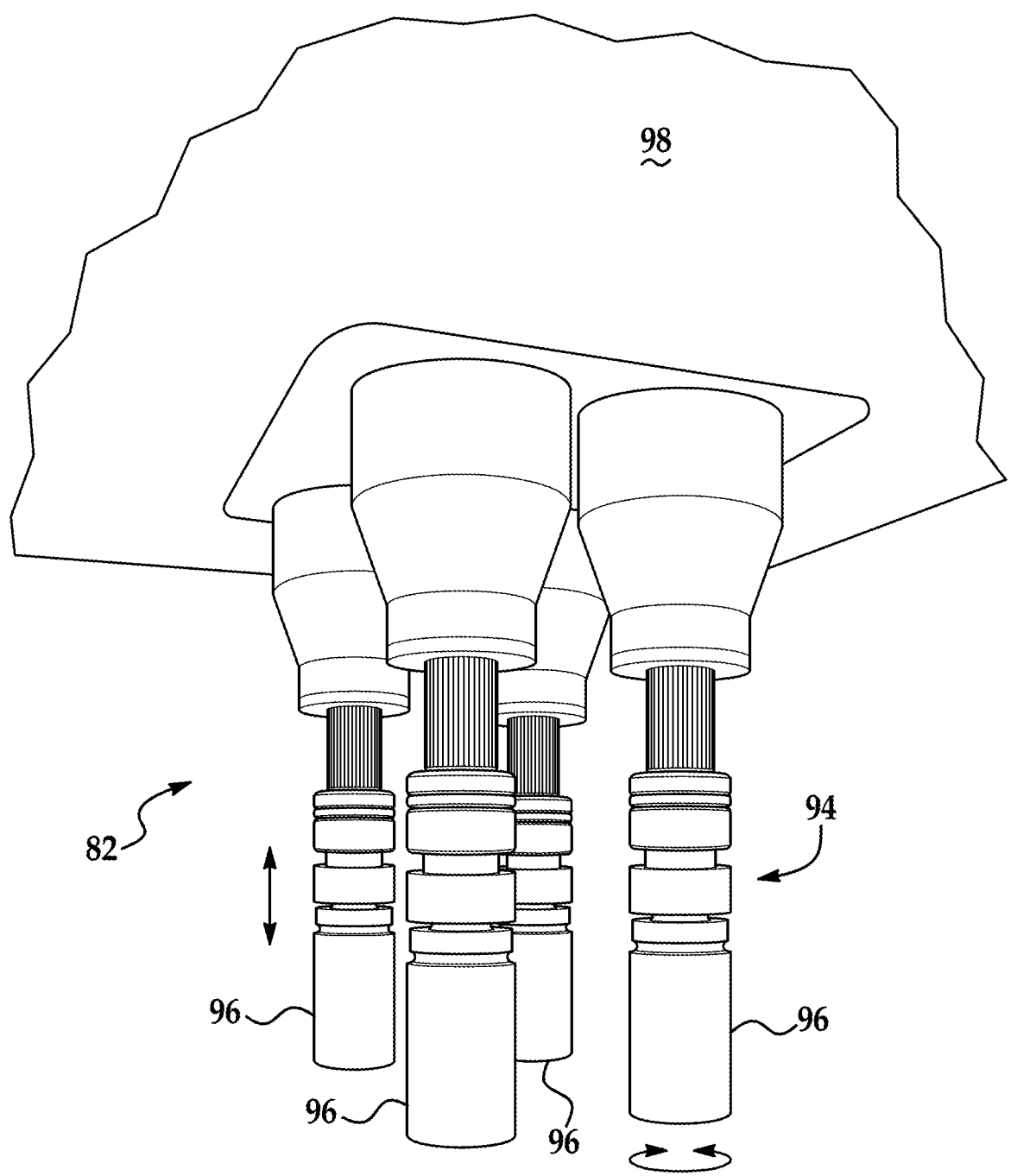
FIG. 3 is an example of an automated industrial nut driver with four nut spindles.
Figure 4:
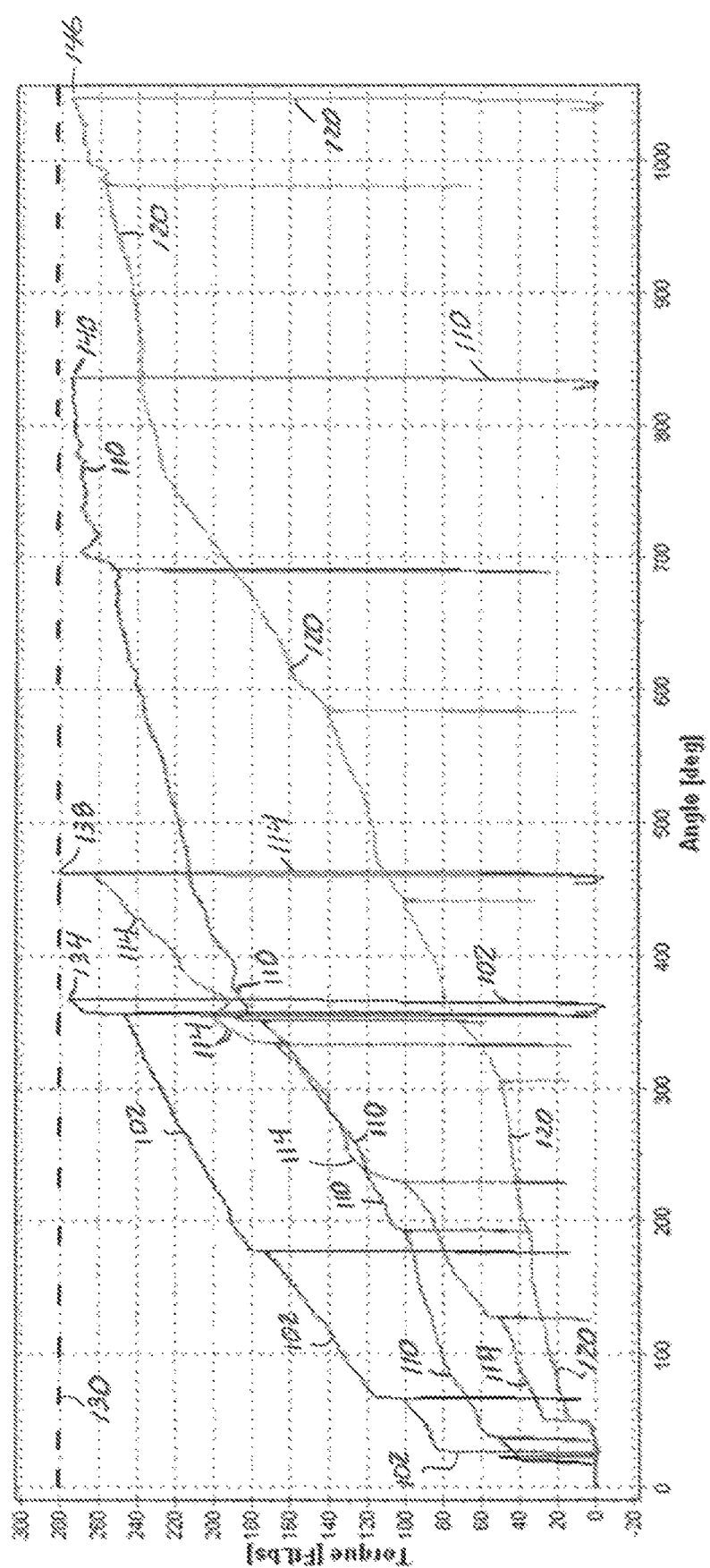
FIG. 4 is a torque versus rotation angle data line trace for a conventional one-run U-bolt joint nut tightening process.
Figure 9:
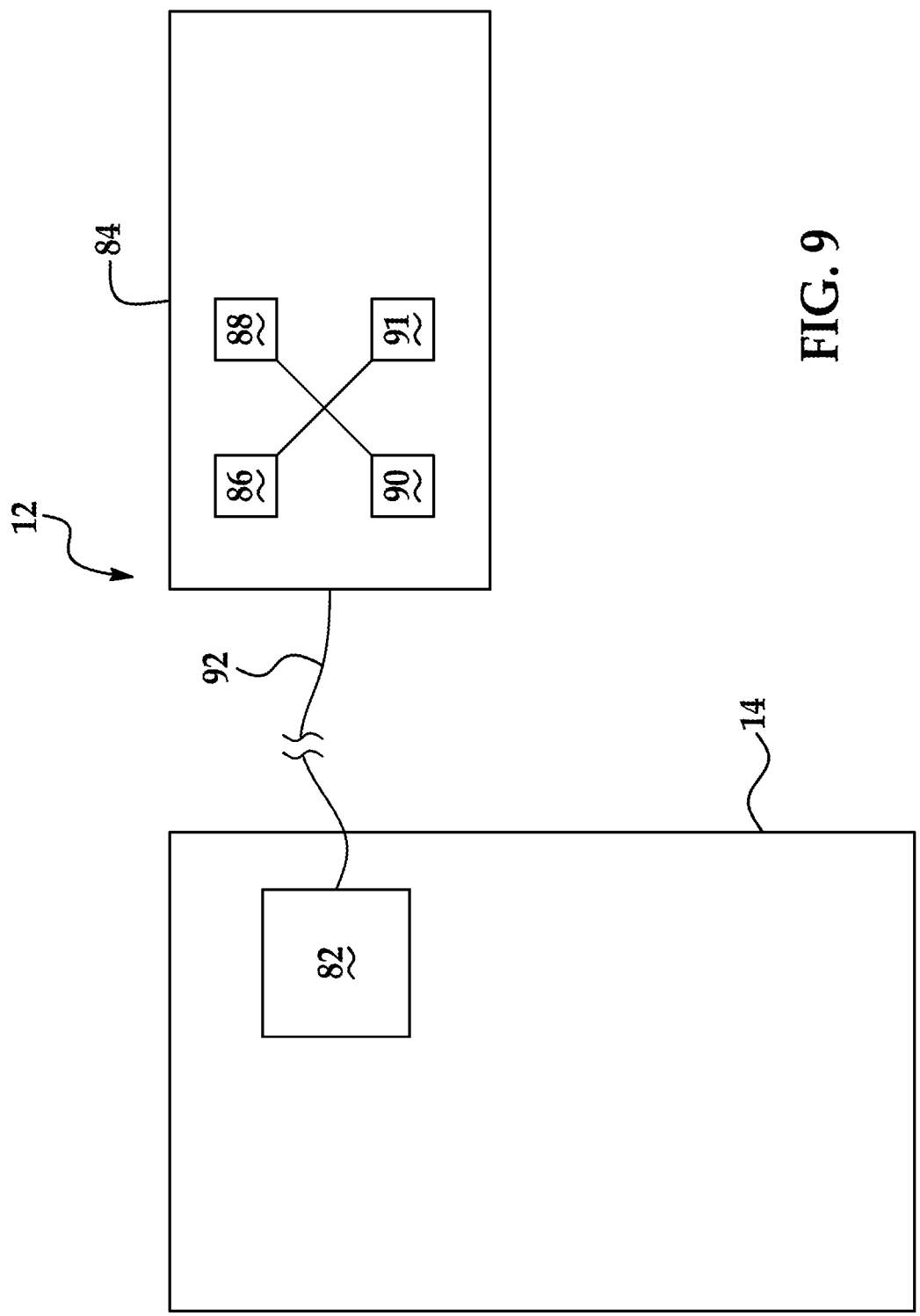
FIG. 9 is a schematic of an example of a device 12 for executing the inventive U-bolt joint stabilization process 10.

Referring to FIGS. 3 and 9, a spindle device 82 having four independently controlled and rotatable drivers 94 as previously described may be used in the manner described below. Spindle device 82 includes programmable controllers and precisions sensors (not shown) and other known hardware to carefully monitor and control several metrics including, but not limited to, vertical position, angular rotation, yield, amperage, torque, and/or torque rate deviation per unit time applied by or to each driver 94.

In a preferred example, device 12 would further include one or more processors 86, controllers 88 and/or data memory storage devices 90 for permanently or temporarily storing preprogrammed software, instructions, sensor metric target values, torque and other limit values as well as data collected during the process (not shown). The processors, controllers, sensors and memory storage devices are in electronic communication, directly through communication cables 92 and those internal to control unit 84 (not shown) or through wireless communication technologies and protocols, with each other to send, receive, process and/or store electronic communications, instructions, signals and/or data between the respective hardware and software as generally described herein and as known by those skilled in the art. One or more monitoring display devices (not shown) may be used to provide visual and/or audible displays for technicians for quality control or other purposes. Other equipment, hardware and software known by those skilled in the art may be used with the device 12 for the process 10 as known by those skilled in the art.

Figure 2:
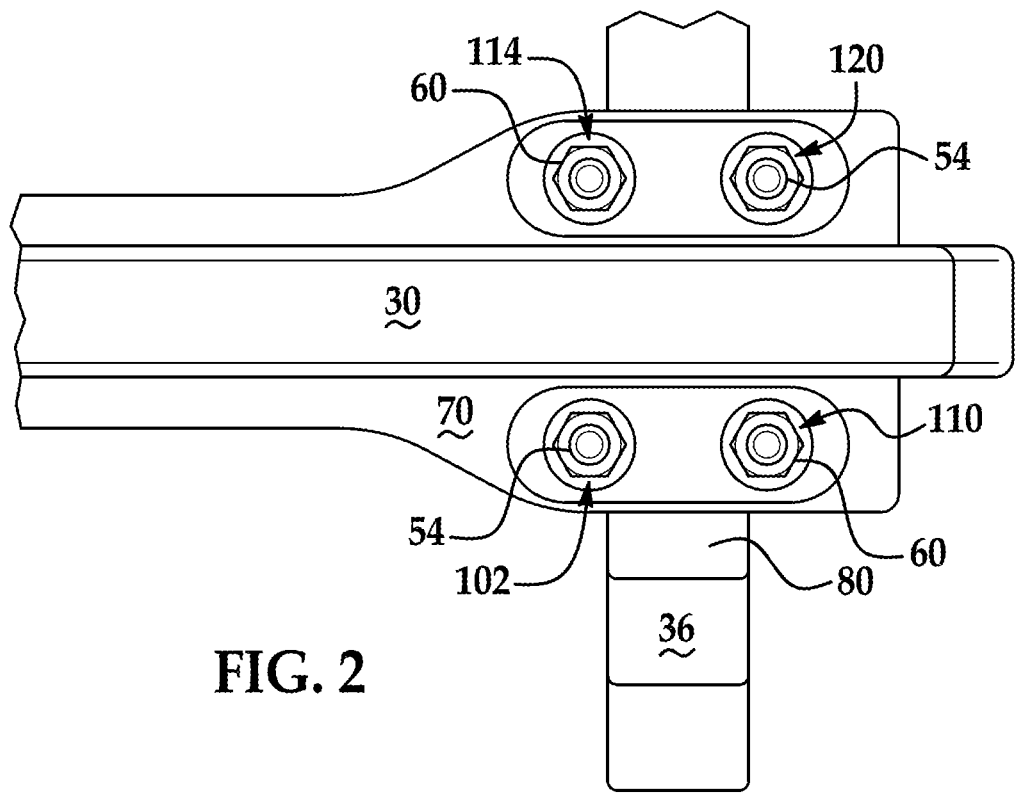
FIG. 2 is a top view of the U-bolt joint shown in FIG. 1.
Figure 5:
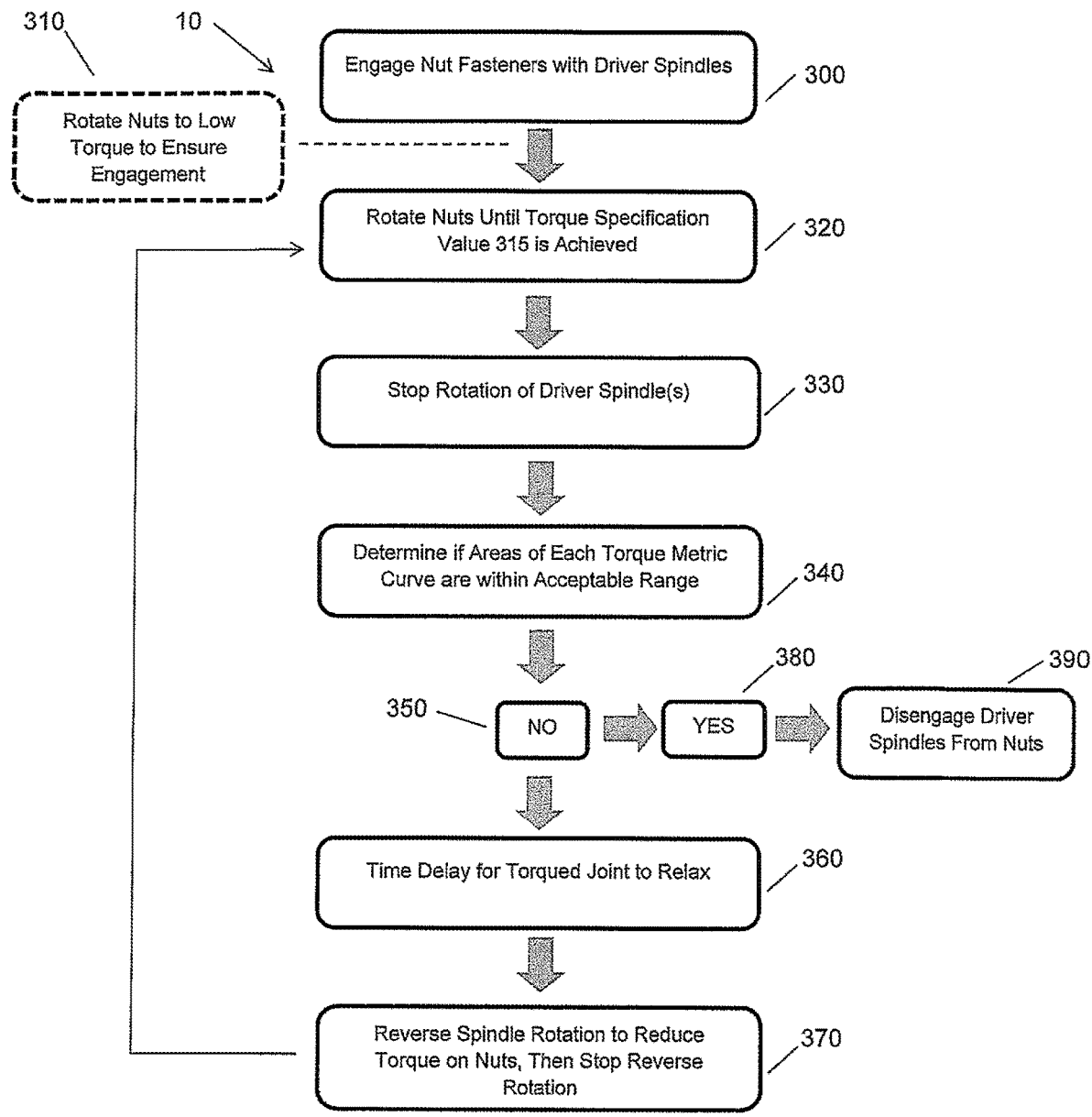
FIG. 5 is a schematic example of an adaptive U-bolt joint stabilization process of the present invention.

In the exemplary process 10 shown in FIG. 5 in an exemplary application shown in FIGS. 1, 2 and 9, components to be assembled are positioned and or secured in holding fixtures in an assembly station 14, for example along an assembly line in an assembly facility (not shown). In a preferred example best shown in FIG. 1, a truck axle 30 is placed in an inverted position atop suspension leaf springs 36 with loosely assembled U-bolts 24 and nuts 50 as generally shown. It is understood that process 10 may be used with other types of mechanical joints and for other assembly or fastener applications as known by those skilled in the art.

Figure 6:
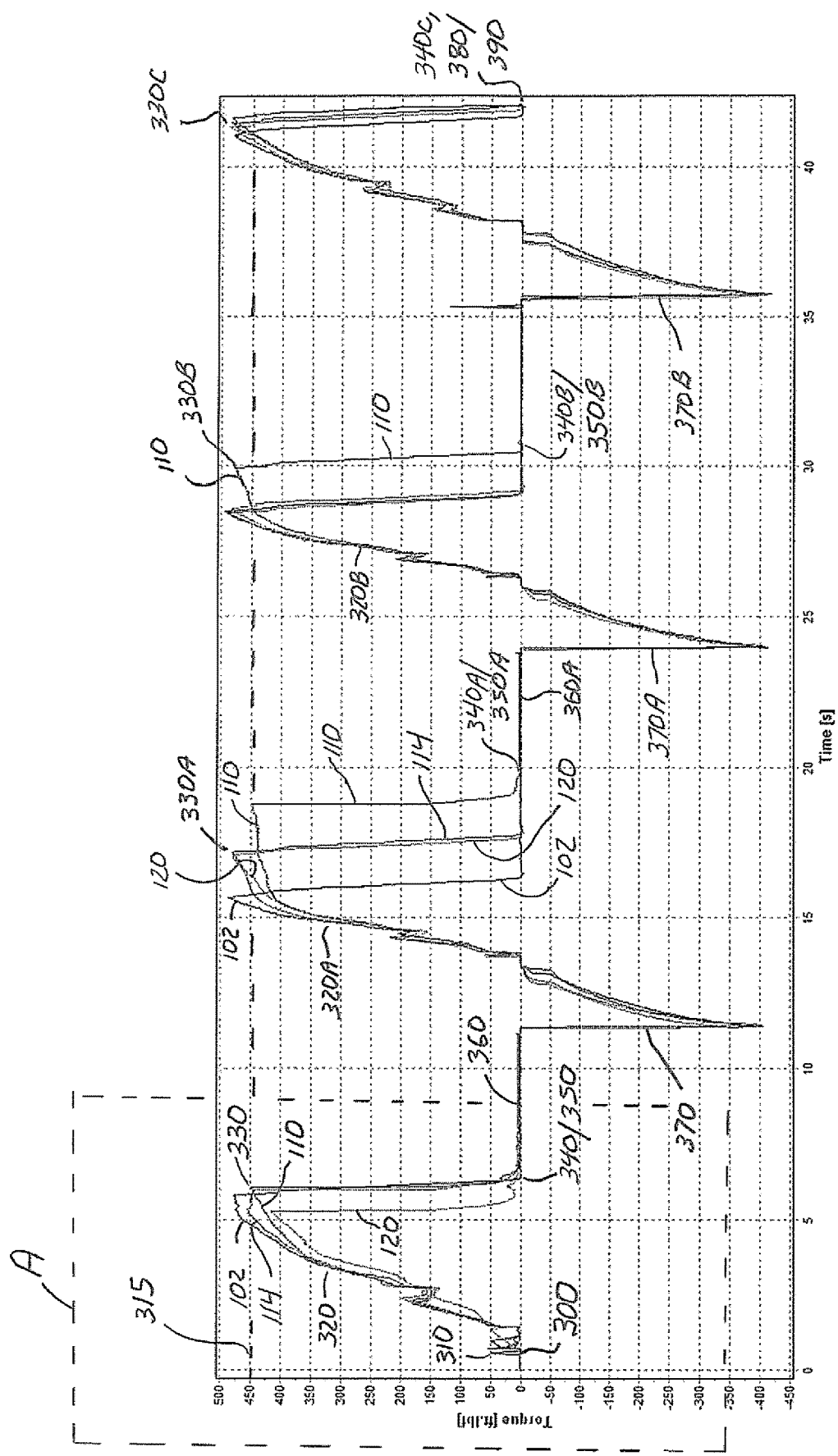
FIG. 6 is a torque versus time data line trace for one example of the invention used on a two U-bolt large truck axle joint.

In exemplary step 300 shown in FIG. 5 and point 300 in FIG. 6, a nut driver, for example one or more spindles 82 shown in FIGS. 3 and 9, is moved into proximity to axle joint 20 and each nut driver 94 is simultaneously placed into engagement with a respective nut 60 as generally shown in the example in FIGS. 1-3 It is understood that other nut or fastener driver device(s) which include a plurality of sensors for measuring, monitoring and communicating torque (ft-lbs), rotational angle (degrees), time (seconds) and other metrics or data known by those skilled in the art, may be used as well as other devices known by those skilled in the art. It is further understood that other fastener drivers other than nut drivers, for example common standard driver bits, straight, phillips, Torx®, allen and other drivers known by those skilled in the art may be used.

Referring to FIG. 6, FIG. 6 is an example data tracing which shows an example of the present inventive process 10 on a U-bolt, vehicle axle to leaf suspension joint, where four (4) nut 60 tightening or torqueing cycles were used to achieve a predetermined nut torque and improved stabilized joint described in detail below. In the illustrated example, the process 10 generates a curve according to the predetermined metrics, in FIG. 6 first metric torque and second metric time and generates or plots a curve from data received from sensors in the spindle device 82 or control unit 84.

Figure 7:
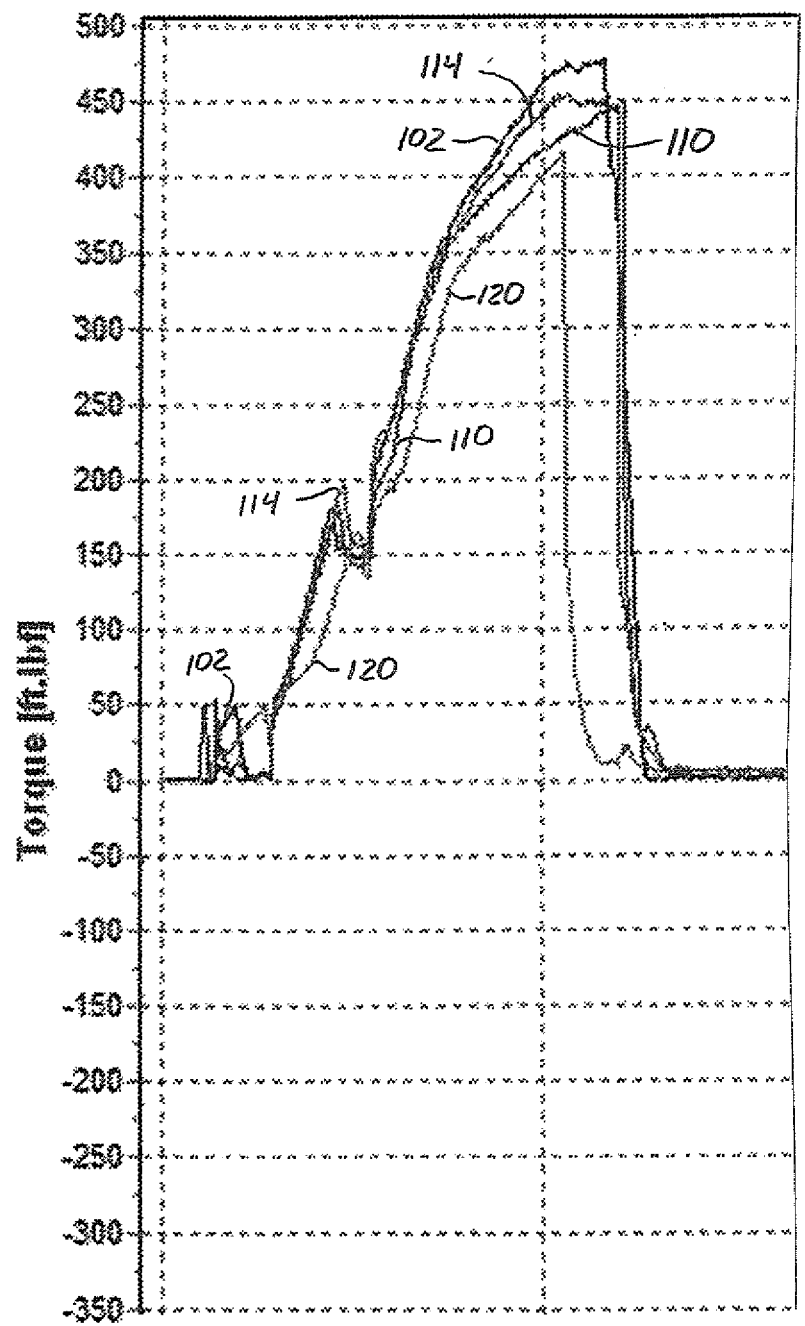
FIG. 7 is an enlarged portion "A" shown in FIG. 6.

Referring to FIGS. 5, 6 and 7, at step 320, the drivers 94 are simultaneously rotated in a clockwise direction to begin a first clampload cycle by tightening the four nuts 60 and compress the joint 20 (first clampload cycle shown on the far left of FIG. 6). In a preferred example, the nuts 60 are continuously and simultaneously tightened toward a predetermined target torque or limit value 315, in the example 450 ft-lbs or ft-lbf. Device 12 through spindle driver 82 and control unit 84 continuously and independently through sensors (not shown) monitors the torque applied by each driver 94 to the respective nut 60. It is also understood that spindle device 82 may, in addition or alternately, further continuously and independently monitor other metrics, for example, angular rotation of each spindle, amperage or other metrics known by those skilled in the art.

In an optional step 310, the nuts 60 may initially tighten to a low torque limit value to ensure that nut driver sockets 96 are engaged with a nut 60.

As shown on he left portion of the FIG. 6 and enlarged portion in FIG. 7, when it is determined through monitoring described above that a particular driver 94 and engaged nut 60 achieve the targeted torque limit value at 315 (or other predetermined metric or value), the particular driver 94 ceases rotation at step 330. The driver 94 preferably maintains engagement with the respective nut 60 and maintains its angular position, but the applied torque through the driver socket 94 falls to zero (0 ft-lbs.) as shown. In a preferred example, the other drivers 94 continue rotating until the target torque level at 315 is achieved. Due to the speed or rotation, a predetermined limit range above and below the target torque 315 may stop the driver 94 once exceeded. In the example shown in the first far left curving in FIGS. 6 and 7, the target torques for all four 102, 110, 114 and 120 nuts occurred within about 6 seconds. As noted, in conventional processes, once the torque targets at 315 were achieved, that typically ended the automated joint tightening process and required several manual checks and often re-torqueing the nuts to the target specification torque to achieve a stabilized joint 20 with acceptable residual torque and compression.

It is noted in FIGS. 6 and 7 that the first clampload cycle curve (far left) that the shapes and areas under the respective curves vary, particularly for nut 120. As described in the Background section, this may be due to many reasons, for example, misalignment and shifting of the U-bolt 24 or the joint subassembly components, which may have resulted in lateral bending or work hardening of U-bolt leg 40 and little or no loading or elastic extension of the U-bolt leg 40 along the longitudinal axis 50 as desired. The monitored metrics, for example torque versus time in FIGS. 6 and 7, when presented in terms of rates will generate a curve that represents work performed. For example, torque versus angular rotation (degrees) or amperage (amps) versus time (seconds), when plotted (or otherwise generated or internally calculated in control unit 84), present an area under the curve that can be used to calculate the work performed or energy applied. As further explained, if the work performed in order to achieve the target torque limit value at 315 is too high or beyond a predetermined value or range for a particular joint design, this suggests undesirable lateral deformation or work hardening of the U-bolt and not desired elongation of the U-bolt legs for a secure and stabilized joint.

At exemplary step 340, the recorded areas under the respective tracing curves for each of nuts 102, 110, 114 and 120 are compared to predetermined target area limit values, for example stored in memory device 90. The predetermined area limit value or values are established prior to step 300 for the particular joint 20 based on design factors and the metrics used. For example, if the metrics monitored are torque versus angular rotation, for example in FIG. 8, the required angular rotation of the nuts 60 needed to achieve a desired compressive force or clampload on the joint 20 can be calculated/predetermined and thereafter serve as the target or limit value 315 for use by process 10. Calculation of the predetermined targets for specific joint designs and fasteners used, as well as the choice of other metrics to be used for the targets, known by those skilled in the art may be used. The process 10 calculation and comparison of the areas under the tracing curves at step 340 can be made by commercially available software known by those skilled in the art. One example of suitable software is Atlas Copco PowerMACS Tools Talk. It is understood that calculation and comparison of other metrics, areas or data against the predetermined target limits or values, for example 315, known by those skilled in the art may be used. In an alternate example not shown, the curve areas of the respective nuts are compared to each other versus a predetermined area limit value or range. Alternately, the comparison between respective curve areas may be done in addition to the comparison of the respective curve areas to a predetermined area limit value. If is further understood that comparisons of the monitored preselected metrics, generated curves and/or curve area data other than to predetermined limits or limit area values known by those skilled in the art may be made.

Looking at the example in FIGS. 6 and 7, using torque versus time as the sensor metrics, it is observed that nut 120 trace shape is not consistent with the other nut trace curves and therefore may have achieved the target torque by not elongating the U-bolt leg 24 along the axis 50 as desired. Alternately, due to the imprecision and known problems with stabilizing U-bolt joints, it may always be desired to run another torque sequence to ensure that any lateral bending or work hardening of the U-bolt 24, or shifting and/or compression of the joint 20 subassembly components has occurred, which if a second torque run-up sequence is not conducted, may result in a non-stabilized joint, low residual torque and high variation of residual torques as described in conventional processes.

In the example process 10, in step 350, if the area under the selected metric tracing or curve is not within a predetermined acceptable limit value or range, then a subsequent torqueing sequence or clampload cycle is initiated to work harden the U-bolt and/or further stabilize the joint 20 subassembly components.

In exemplary step 360, an exemplary time delay is used in order to allow the joint to "relax." That is, a predetermined time of inactivity is set to allow at least some of the heat generated in the joint from the rapid run-up of the nuts 60 to the torque target 315 in the first clampload cycle and/or allow some generated stresses to be relieved in joint 20. The predetermined time delay 360 may be a short period or an extended period based on the design of the joint and the assembly process. For example, if a high target torque limit value is set, that will generate more friction and heat in the joint, so a longer period may be needed to reduce the temperature and relieve at least some internal stresses that built up in the first torque clampload sequence.

In an example shown in step 370, following expiration of the exemplary time delay 360, nut drivers 94 are reversed in a counterclockwise direction to untighten the nuts 60 and decrease the amount of torque on the nuts 60 and compressive force in the joint 20. The torque on the nuts 60 may, for example, be lessened to 50 ft.-lbs. The predetermined lesser torque achieved in step 370 is halted when the value is achieved and the drivers' counterclockwise rotation stops and the torque rises to about zero (0 ft-lbs). It is understood that the above time delay in step 360 and/or reversal of the nuts in step 370 may vary or may be eliminated depending on the joint design and performance specifications.

In the preferred example shown, either instantaneously or after a brief delay, the s process beginning at step 320 is repeated in a second clampload cycle. For example, nut drivers 94 are driven in a clockwise direction to run-up the nuts 60 to the target torque (or other predetermined metric) 315 as described above and illustrated in FIG. 5 as 320A. When the nuts respectively achieve the target torque limit value 315 at point 330A, the respective drivers 94 are halted as described above and at step 340A, the areas under this second set of second clampload cycle curves are evaluated against the previously discussed predetermined area limit value or range to determine whether the joint is stabilized or whether continued work hardening of the U-bolt or shifting or undesired compression of portions of the joint subassembly components is occurring. As described above, the joint may be experiencing uneven compression or dislocation of an excess amount of rust protective coating on a subassembly component etc. Alternately, a U-bolt leg 40 may be yielding under lateral forces in order to partially conform to the subassembly components.

As can be seen from the second FIG. 6 clampload cycle curve set (second set of peaks from the left), second nut 110 took several seconds longer to reach the target torque 315 than the other nuts advising that the joint has not stabilized and proper axial elongation of U-bolt let 40 engaged with nut 110 may not have occurred potentially leading to low residual torque.

Since at least nut 110 has not conformed or met the target curve area limit or range, a time delay 360A occurs, the drivers 94 are, for example, reversed at 370A and then stopped resulting in zero (0 ft-lbs) applied torque imparted by the drivers 94.

In the example, process 10 then for a third time initiates a third clampload cycle 320B run-up of all of the nuts 60 through steps 320-340 as described above and illustrated in FIG. 1. As can be seen in the third clampload cycle tracings curve (third set of peaks from the left in FIG. 6), second nut 110 continues to deviate from the other three curves. Notably, the other three nuts 102, 114 and 120 curves are almost in substantially the same curve shapes and areas under the curves advising that no further undesired lateral bending of the U-bolt or uneven shifting or compression of the subassembly of adjacent components is taking place affecting these three shafts 40. Such uniformity in curve shape and area advises the torqueing of these nuts is resulting in the desired elongation of the three U-bolt legs needed for a stabilized joint and proper residual torque on completion of the assembly process.

All four nuts not having achieved the target area under the torque versus time tracing curves, steps 360-340 (i.e. 360, 370, 320, 330 and 340 in FIG. 5) in an exemplary fourth clampload cycle are again repeated as described above.

Referring to the far right curve in FIG. 6 illustrating the fourth clampload cycle, it is observed that the torque versus time curves are substantially identical in shape and areas under the curves and all took about 7-8 seconds to achieve the targeted torque or limit value 315. At exemplary step 380, it is recognized and acknowledged by process 10 and device 12 either through automatic means in the pre-programmed controls in spindle device 82, or control unit 84, or alternately, through manual approval by a technician, that the curves/tracings are within a predetermined and acceptable range for proper joint compression.

At exemplary step 390 the drivers 94 are disengaged from the nuts 60 completing the stabilization and tightening of joint 20.

Figure 8:
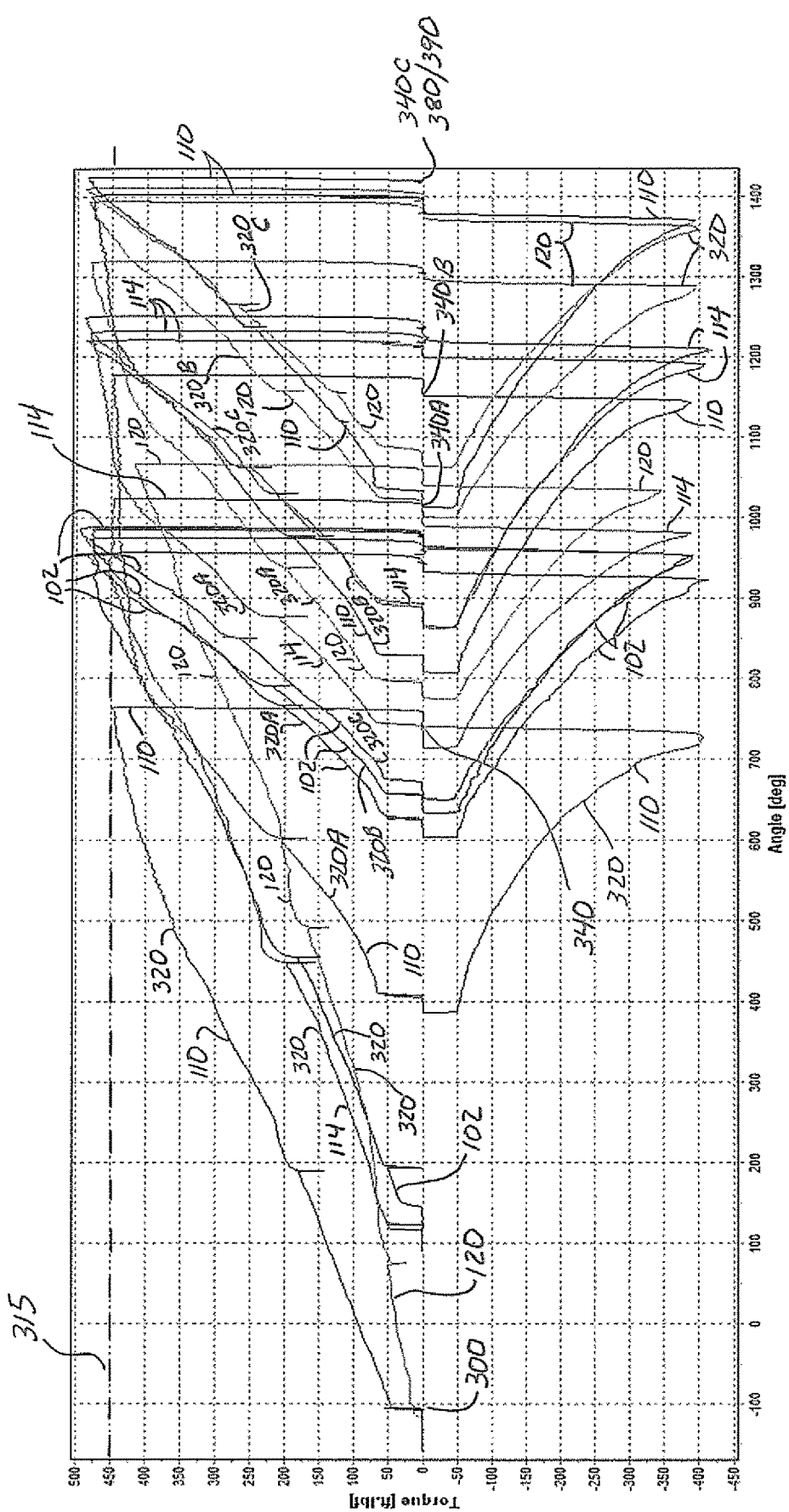
FIG. 8 is an alternate torque versus nut angle of rotation data line trace for one example of the invention for the two U-bolt large truck axle used in the alternate tracing in FIG. 6.

In an alternate example shown in FIG. 8, the first metrics of torque (ft.-lbs.) versus a second metric of angle of rotation (degrees) are used instead of the FIGS. 6-7 of torque versus time. FIG. 8 also shows four separate clampload or torqueing cycles as FIGS. 6 and 7. For this example, the process and steps as described for FIGS. 6 and 7 are substantially the same. All four nuts 102, 110, 114 and 120 are engaged by drivers 94 and simultaneous rotated in step 320 until a target torque or limit at 315 is achieved. Each driver 94 is stopped on achieving the target torque value 315 reducing the applied torque to zero (0 ft-lbs).

The common phenomenon of varying amounts of rotation of each nut is shown indicating an unstabilized joint due to one or more of the conditions described above. The areas under the torque versus rotation angle are checked against a predetermined design value in step 340.

As described above, if the selected metrics curves or areas under the curves of any of the four nuts 60 fall outside of an acceptable predetermined limit range of the predetermined target value at step 350, exemplary clampload cycle steps 360-340 (i.e. 360, 370, 320, 330 and 340 in FIG. 5) are initiated again through rotation of all four nuts to the target torque 315 as described above. As can be sees as the curves trend to the right in FIG. 8, particularly for nuts 110 and 120 the respective amount of rotation needed to achieve the target or limit value torque 315 generally decreases for each run-up (steps 360-340). This, again, is due to the gradual work hardening of the U-bolts 24 to conform to the subassembly of components and settling of any shifting of subassembly components and uneven compression due to, for example, excess corrosion coating between components.

As can be seen in FIG. 8, the curve farthest to the right for each of the respective nuts 102, 110, 114 and 1120 is approximately 300-400 degrees of rotation advising of a stabilized joint and elastic elongation of U-bolt legs 40 desired for high residual torque and reduced variance of torque between the nuts.

Although two examples using torque and different metrics of time or rotation angle are illustrated and described, it is understood that different metrics other than torque versus time or rotation angle may be used as known by those skilled in the art. It is further understood that variation in the steps and sequence while achieving the described objectives and performance characteristics as described above known by those skilled in the art may be used. For example, a particular joint design may not generate significant heat, so the time delay in step 360 may be greatly reduced in duration or eliminated altogether. Process 10, although described as particularly useful on U-bolt joints for heavy truck axles, may be applied to other threaded fasteners and mechanical joints which include similar assembly disadvantages and challenges.

Further, although four total clampload cycles or torque run-up sequences of steps 320-370 are used, it is understood that fewer or a greater number of clampload cycles or torqueing (or other metric) sequences may be used depending on the joint design and other factors mentioned, for example the number of subassembly components or corrosion coatings applied etc.

The inventive process 10 and device 12 is adaptive and effectively separates the conventional one "run and done" torque sequence into two separate processes. The first clampload cycle or sequence serves to stabilize the joint through necessary yielding or plastic deformation of the U-bolt to conform or adjust to the surrounding subassembly components and orientation. These first clampload process cycle further serves to settle or normalize the other factors of irregularity or imprecisions of the joint mentioned above. Through repeated clampload torque run-up cycles of exemplary steps 320-370, these joint imprecisions or imperfections are stabilized or resolved leading to the second process—a final run-up clampload cycle 320-340 and 380-390 which focuses the torque (or other selected metric) on axial, elastic deformation of the U-bolt legs 40 along axis 50 to achieve a proper residual torque for a robust, stabilized mechanical joint.

The inventive process 10 and device 12 is adaptive in the sense that although several target limit values are predetermined based on the design of the mechanical joint, fasteners used and subassembly components in the joint, the number of clampload run-up torque (or other metric) sequences

320-390 are preferably automatically varied in number until the predetermined limit values are achieved, and imperfections are resolved or stabilized, so the joint is placed in a condition for a final clampload cycle torque run-up to properly elongate the bolts for proper mechanical fastening leading to a more robust and durable joint. Studies have shown higher residual torque values, improvements as high as 46% versus conventional processes, and less variation in residual torque between nuts of the same joint. Studies have shown that due to the higher residual torques and less variation, fewer, if any manual checks of the U-bolt joints and re-torqueing of the nuts to the targeted specifications are needed greatly reducing subsequent, manually-intensive processes after assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adaptive method for applying a clampload in a mechanical joint having at least one threaded fastener, the method comprising the steps of:
    engaging a removable threaded fastener with a fastener driver;
    initiating a first clampload cycle further comprising the steps of:
        tightening rotation of the fastener to a predetermined limit value;
        monitoring a predetermined first metric and a predetermined second metric during the tightening rotation;
        generating a first curve of the work expended in tightening rotation of the fastener to the predetermined limit value based on the predetermined first metric and the predetermined second metric forming a first area under the first curve;
        comparing the first area under the first curve to a predetermined area limit value;
        determining whether the first area is within the predetermined area limit value, wherein if the generated first area is greater or lesser than the predetermined area limit value, initiating at least a subsequent second clampload cycle including the steps of the first clampload cycle; and
        disengaging the fastener driver from the threaded fastener when a last in time initiated clampload cycle generated curve area is within the predetermined area limit value.

2. The method of claim 1, wherein the removable threaded fastener comprises a first U-bolt having first shaft, a second shaft and a first nut and a second nut threadably engageable with the respective first and the second shaft, wherein the step of tightening rotation of the fastener further comprises:
    simultaneously tightening rotation of the first nut on the first U-bolt shaft and the second nut on the second U-bolt shaft; and
    wherein the step of monitoring the first and second metric further comprises:
        independently monitoring the first and second metric for each of the first and the second U-bolt shafts; and
    wherein the step of generating a first curve further comprises:
        independently generating a first curve for the first shaft and a second curve for the second shaft; and
    wherein the steps of comparing the first area under the first curve further comprises:
        independently comparing the first curve and the second curve against the predetermined area limit value; and
    wherein the step of determining whether the first curve area is greater or lesser further comprises:
        independently determining whether the first area and the second area is within the predetermined area limit, wherein if either of the first area or the second area is greater or lesser than the predetermined area limit value, initiating the second clampload cycle for the first and the second U-bolt shafts.

3. The method of claim 2 wherein the threaded fastener further comprises a second U-bolt having a third and a fourth shaft and a third and a fourth nut threadably engageable with the respective third and fourth shaft, the method further comprising:
    simultaneously tightening rotation of the first, second, third and fourth nut on the respective U-bolt first, second, third and fourth shaft;
    independently monitoring the first and second metric for each of the first, second, third and fourth U-bolt shafts;
    independently generating a first, second, third and fourth curve for the respective first, second, third and fourth shaft; and
    independently comparing each of the first, second, third and fourth curve against the predetermined area limit value; and
    independently determining whether the first, second, third and fourth areas are within the predetermined area limit value, wherein if one of the first, second, third or fourth area is greater or lesser than the predetermined area limit value, initiating the second clampload cycle for the first, second, third and fourth U-bolt shafts.

4. The method of claim 2 wherein the mechanical joint is a vehicle axle leaf spring joint.

5. The method of claim 2 wherein the step of generating the first and the second curves comprises the step of 2-dimensionally plotting the first and the second curves.

6. The method of claim 2 wherein the first predetermined metric is torque and the second predetermined metric is one of time or angle of rotation about a fastener rotational axis.

7. The method of claim 2 further comprising the step of: delaying initiation of the second clampload cycle for a predetermined time to allow a reduction of heat and residual stress in the mechanical joint.

8. The method of claim 1 wherein the step of generating a first curve comprises the step of 2-dimensionally plotting the curve.

9. The method of claim 1 wherein the first predetermined metric is torque and the second predetermined metric is one of time or angle of rotation about a fastener rotational axis.

10. The method of claim 1 further comprising the step of:
    delaying initiation of the second clampload cycle for a predetermined period of time to allow a reduction of heat and residual stress in the mechanical joint.

11. The method of claim 10 further comprising the step of:
    untightening rotation of the fastener to below the predetermined limit value for a first period of time prior to initiation of the second clampload cycle.

12. The method of claim 1 wherein the predetermined limit value and predetermined area limit value are ranges of values.

13. The method of claim 1 wherein the step of monitoring the first and second metrics comprising;
    sensing through a plurality of sensors in communication with the fastener driver at least two of torque, time, fastener rotation about a fastener axis or amperage.

14. The method of claim 13 wherein the step of engaging a fastener driver further comprises engaging a programmable fastener driver having a plurality of independently controllable nut drivers.

* * * * *